United States Patent [19]

Johansson

[11] 4,366,900
[45] Jan. 4, 1983

[54] MULTIPLE BELT CONVEYAR WITH SYNCHRONIZER

[76] Inventor: Rolf Johansson, Blombergsvagen 5, 702 30 Orebro, Sweden

[21] Appl. No.: 233,598
[22] PCT Filed: Apr. 17, 1980
[86] PCT No.: PCT/SE80/00109
  § 371 Date: Dec. 20, 1980
  § 102(e) Date: Nov. 20, 1980
[87] PCT Pub. No.: WO80/02277
  PCT Pub. Date: Oct. 30, 1980

[30] Foreign Application Priority Data

Apr. 20, 1979 [SE] Sweden .................................. 7903475

[51] Int. Cl.³ .................................................. B65G 23/00
[52] U.S. Cl. ................................. 198/855; 192/48.7; 192/71; 192/93 C; 198/817
[58] Field of Search ............... 198/812, 688, 817, 858, 198/859, 855; 192/48.7, 71, 93 C; 64/6

[56] References Cited
U.S. PATENT DOCUMENTS

| | | | |
|---|---|---|---|
| 2,164,535 | 7/1939 | McBride | 198/817 |
| 2,203,573 | 6/1940 | Krause | 198/817 X |
| 2,920,751 | 1/1960 | Krupp et al. | 198/817 X |
| 2,932,381 | 4/1960 | Kihnilutt et al. | 198/817 |
| 2,965,217 | 12/1960 | Dommann | 198/854 |
| 3,552,546 | 1/1971 | Rath | 198/812 X |
| 3,757,924 | 9/1973 | Yakubek | 198/855 |

*Primary Examiner*—John J. Love
*Assistant Examiner*—Douglas D. Watts
*Attorney, Agent, or Firm*—Dennison, Meserole, Pollack & Scheiner

[57] ABSTRACT

When building, particularly private houses, it is necessary to convey goods such as roof tiles up to the roof. Conveyors have been produced which are of fixed shape, heavy and inconvenient to transport. The present invention presents a conveyor which is light and takes up little space when being transported. The conveyor consists of a central unit (I) comprising a telescopic tube which can be collapsed during transportation and pulled out to its full length for operation. The central unit is provided at each end with two transverse units (3L, 1A) over which two parallel belts (1E) are placed, said belts being preferably of nylon and being provided with a number of pushers (3H) arranged one after the other. A synchronization means (3A-D FIG. 2) is provided to align the pushers on the two belts at the same transverse level.

4 Claims, 5 Drawing Figures

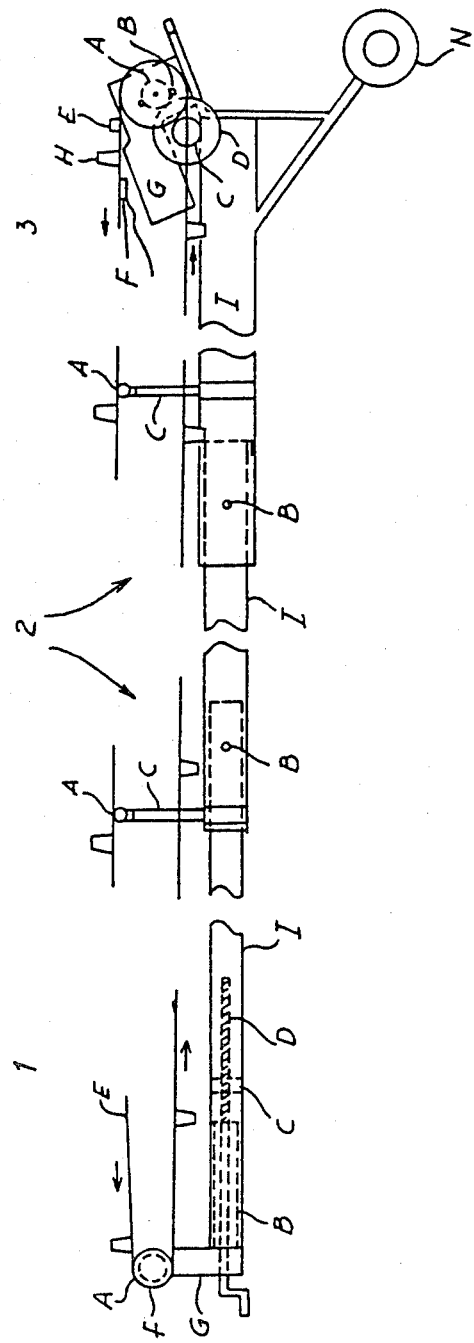

MULTIPLE BELT CONVEYAR WITH SYNCHRONIZER

The present invention relates to a belt conveyor.

Such a belt conveyor, which is used for numerous purposes in the building trade, for instance, generally has an endless belt of a certain width corresponding to the articles to be conveyed. It runs around a number of rollers journalled in two robust side pieces. Due to this construction the size and weight of the conveyor often does not correspond to the weight of the goods to be conveyed. This is particularly disadvantageous if the conveyor is to be used in several different working sites, as in the building industry, for instance.

A considerably lighter construction is achieved according to the present invention since the belt is divided into two parallel belts running one on each side of a central body. It may thus be assumed that the conveyor will be sufficiently steady if it is capable of carrying the load for which it is intended. The weight of the conveyor can thus be kept so low that it can easily be moved and erected ready for work by one or at most two men.

In the drawings:

FIG. 1 is a side schematic elevation broken away in part showing a conveyor according to the invention;

FIG. 1 shows the conveyor seen from the side and for the sake of clarity the figure has been broken apart and shortened. The Figure thus falls into three sections, namely the ends 1 and 3 and the central part 2. Within these sections the various components have been designated by index A, B, C and so on. The conveyor is built up around the central frame or body I which consists of three parts which can be pushed into each other telescopically in order to facilitate transportation from one erection site to another. In extended position the three parts are locked to each other by means of pins or bolts 2B.

Figure 2C:
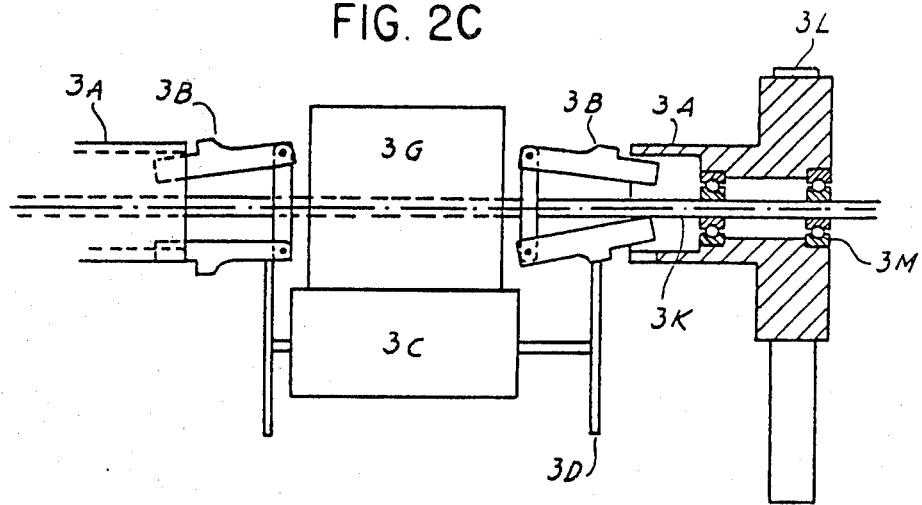
FIG. 2 is a top plan view partly in section and with parts broken away of the conveyor.
Figure 2B:
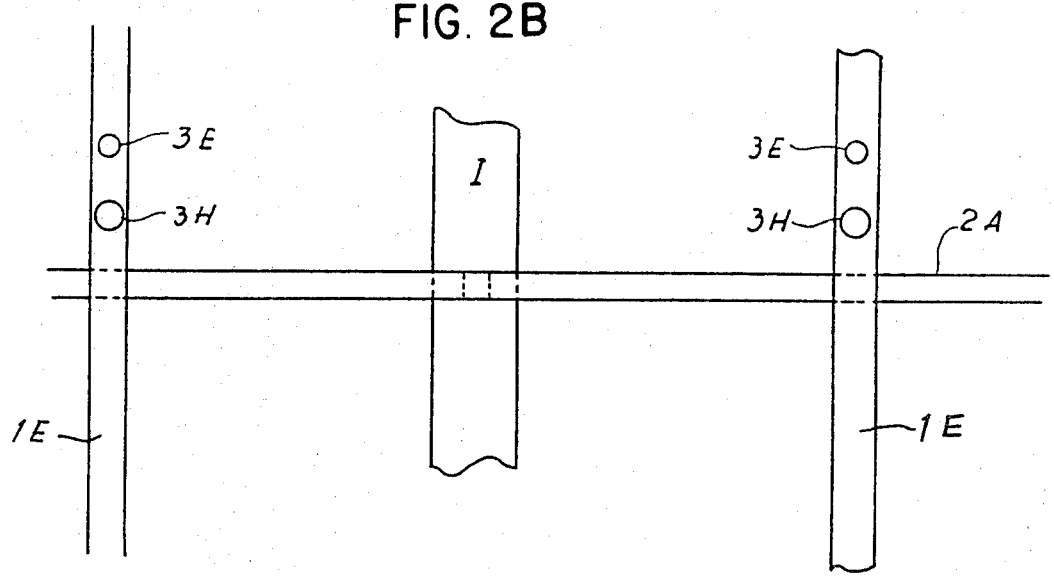
Figure 2A:
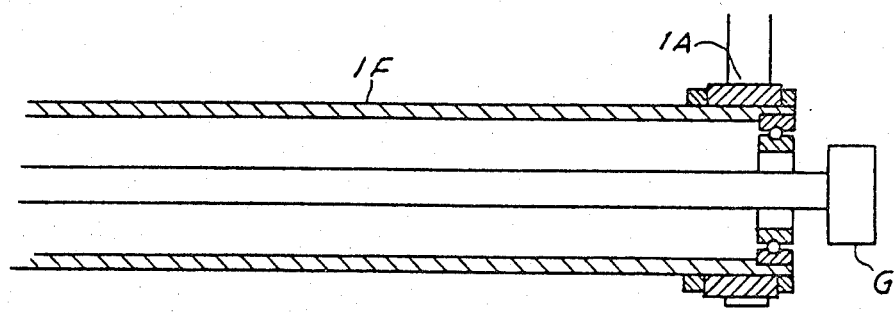

As can also be seen in FIG. 2, the two parallel belts 1E pass over guide rollers 1F and 3L at the ends of the conveyor. In order to tension the belts the guide roller 1F, which is not driven, is arranged on a bracket 1G located on a tube 1B passing into the body I. By means of a sindle 1D with screw-threading which screws into a nut 1C in the body, the bracket 1G can be moved in either direction. Other brackets 2C with support rollers 2A for the upper sections of the belts are provided at suitable intervals along the body. A number of pushers 3H are also provided on the belts 1E in order to push the load units along. These pushers may be in the form of extremely simple rubber studs or the like. The belts may consist of strong, relatively narrow strips of nylon, for instance, having a width of five to ten centimeters.

The belts are driven by the guide rollers 3L at the righthand end of FIG. 1. These guide rollers are in turn driven by a motor 3G with suitable gear ratio. The guide rollers are located on the driving shaft 3K from the motor but can turn freely on this on ball-bearings 3M. They are driven individually by one of the clutches 3B in a clutch coupling, the other part of which is in a cylindrical core 3A on the guide roller 3L. The principle can be seen more clearly in FIG. 3 which shows an axial view of the coupling.

Figure 3:
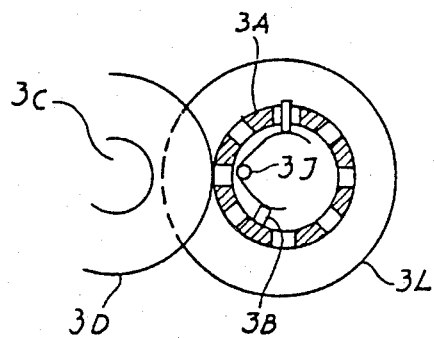
FIG. 3 is a sectional view of a coupling shown in FIG. 2.

As is clear from FIGS. 2 and 3 the core 3A is cut to form a number of teeth between which the dogs 3B can engage. The dogs are located on a transverse arm on the drive shaft 3K. Furthermore, the dogs 3B are placed in relation to each other and in relation to the pitch of the teeth in the core 3A in such a way that no more than one of the dogs can engage at a time between these teeth. A spring 3J between the dogs presses them apart and in between the teeth.

The clutch couplings are controlled by double-action electro-magnet 3C, circular discs 3D being provided at the ends of its armature. When the armature is driven in one direction or the other, one of these discs will actuate nibs on the dogs 3B which are therefore forced out of engagement with the teeth on the core 3A. The magnet 3C is controlled by indicators 3E on the belts 1E. These indicators may consist of small permanent magnets fitted at the same distance from the pushers 3H on the belts. With the help of these indicators it is thus possible to determine whether the pushers on the two belts maintain the same position opposite each other.

It is obvious that this can never be so since it is impossible to make the two guide rollers 3L so exactly similar that the two belts always run exactly synchronously. However, by briefly releasing one or other of the clutch couplings 3A, B, however, the corresponding belt can be made to stop briefly so that the other catches up. This is done by the indicators 3E actuating the magnet contactors 3F located somewhere in the body I so they are passed by the indicators.

Figure 4:
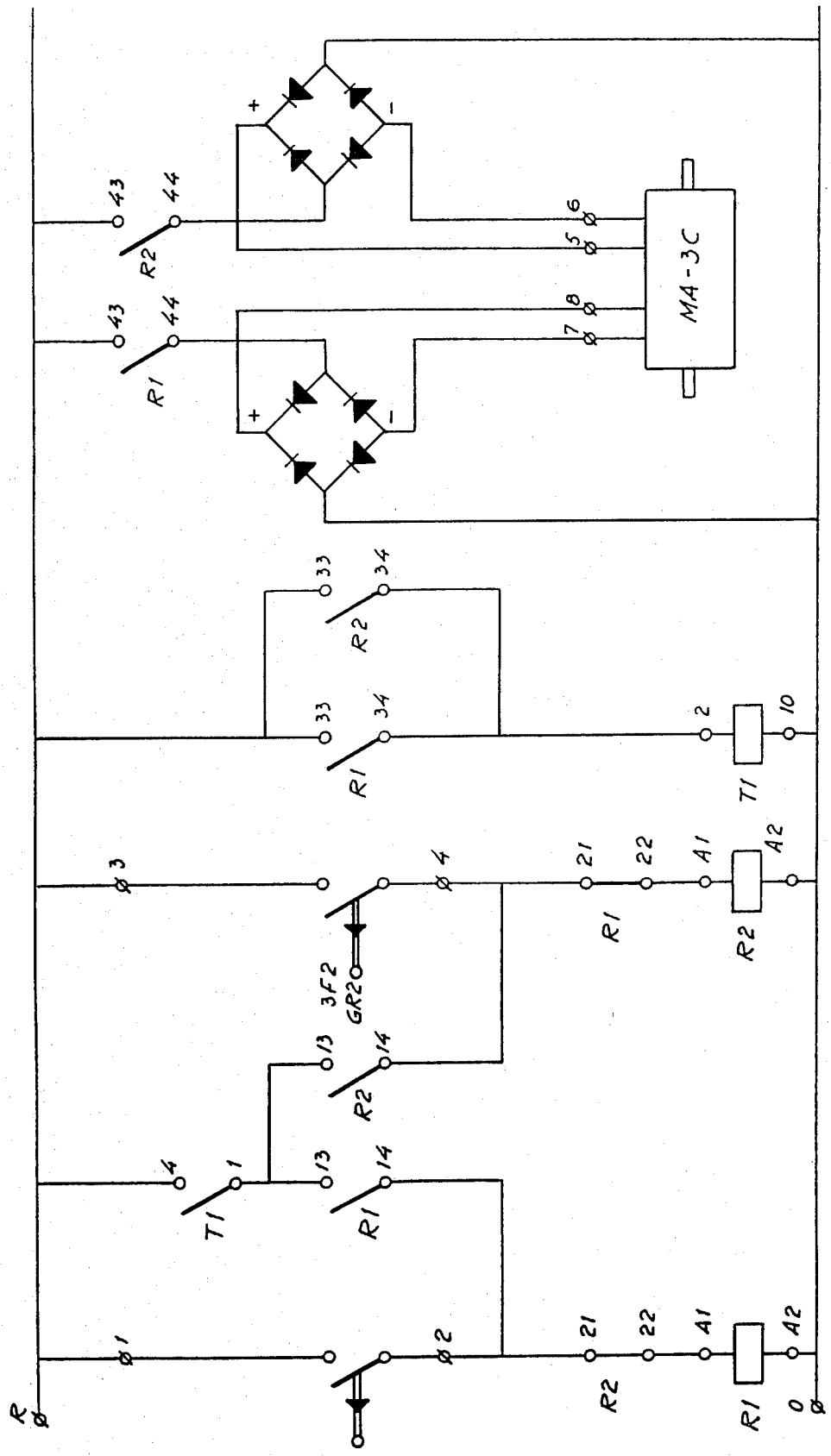
FIG. 4 is an electrical circuit schematic for the conveyor.

The principle of this can be seen in FIG. 4 which shows an electrical circuit diagram for the synchronization.

Relays R1 and R2 are provided for the two couplings 3A, B for the belts and these are actuated by magnet contactors 3F1 and 3F2. The relays R are provided with contacts for excitaton circuits for themselves and to cut out each other as well as for a time relay T1, the contact of which is included in a mutual excitation circuit for the relays R. These relays are also provided with contacts for both halves of the electromagnet 3C. The function is as follows:

The indicator 3E which first passes its magnet contact 3F switches in the corresponding relay R which activates the time relay T1 which, for a certain period thereafter corresponding, for instance, to a turn or so of the guide roller 3L, keeps the relay R connected. The magnet 3C is then connected in over the corresponding relay contact and a rectifier bridge in one direction or the other so that first one and then the other of the dogs 3B in the corresponding coupling is alternately knocked out of engagement with the teeth on 3A. Angular displacement between the two parts of the coupling is thus achieved corresponding to two divisions in the teeth in 3A for each turn of 3L. The excitation time for the relay T1 is set so that an angular displacement is achieved in the clutch coupling which corresponds approximately to the displacement between the belts 1E occurring during one complete turn thereof.

The synchronizing means with clutch coupling should be taken as an example. There are a vast number of different couplings which can be tripped within the known technique and the one most suitable for a particular conveyor according to the invention is dependent upon cost and dimensions. Similarly, other types of indicators and synchronisers are also feasible. The essential feature of the invention is that the conveyor is provided with two parallel belts, the synchronous travel of which is ensured in some way so that the pushers on the belts are kept substantially opposite each other.

FIG. 2 shows how the guide roller 1F is designed as a hollow tube with a pair of bushings 1A at the ends. These bushings act as a sort of friction coupling to make the displacement between the belts smoother when the synchronizing means is engaged.

It is also clear from FIG. 1 how the conveyor is provided with wheels N at one end to facilitate transport.

Figure 5:
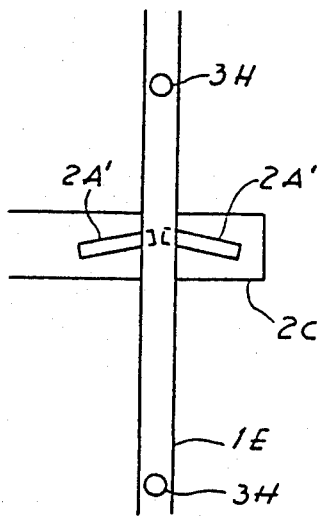
FIG. 5 is a modification of the support rollers shown in FIG. 2.

FIG. 5 shows how the support rollers 2A can be designed as pairs of rollers placed at angles to each other, possibly coated with rubber or some other friction material. With the direction of movement shown, therefore, the belts 1E will tend towards the point of the angle between the two rollers in the pair so that the belts are guided on their way between the guide rollers 3L and 1F.

I claim:

1. A belt conveyor for moving roofing tiles or the like comprising an elongated body member, guide roller means on each end of the body member, a pair of narrow endless parallel conveyor belts passing over and guided by said roller means, at least one pusher lug on the surface of each of the belts, at least one magnetic position indicator means on each belt, the guide roller means on one end of said body including separate rollers for each belt, a drive shaft on the one end of said body, motor means for driving said shaft, said separate rollers on the said one end of the body being freely rotatable on said shaft clutch means for drivingly and independently connecting each of said rollers on the said one end to said shaft, electromagnetic means for operating said clutch means, stationary magnetic control means for sensing the proximity of said magnetic position indicator means, and synchronizer means acting in conjunction with said magnetic control means and said electromagnetic means to automatically synchronize the two belts to maintain the pusher lugs thereon directly opposite to each other.

2. A belt conveyor as defined in claim 1 wherein said electromagnetic means is of the double-acting type and capable of engaging only one of the clutch means at one time.

3. A belt conveyor as defined in claim 1, wherein the guide roller means on the other end of said body includes a single non-driven guide roller and bushings frictionally mounted thereon over which the belts pass to moderate the synchronizing movement between the belts.

4. Belt conveyor according to claim 1, wherein the body is telescopic in order to facilitate removal of the conveyor.

* * * * *